United States Patent
Leikas et al.

(10) Patent No.: US 7,324,712 B2
(45) Date of Patent: Jan. 29, 2008

(54) QUALITY FACTOR

(75) Inventors: Esa Leikas, Espoo (FI); Henrik Haggrén, Espoo (FI); Seppo Väätäinen, Espoo (FI)

(73) Assignee: Mapvision Oy Ltd., Espoo (FI)

( * ) Notice: Subject to any disclaimer, the term of this patent is extended or adjusted under 35 U.S.C. 154(b) by 521 days.

(21) Appl. No.: 10/496,148

(22) PCT Filed: Nov. 25, 2002

(86) PCT No.: PCT/FI02/00949

§ 371 (c)(1),
(2), (4) Date: Sep. 9, 2004

(87) PCT Pub. No.: WO03/044459

PCT Pub. Date: May 30, 2003

(65) Prior Publication Data

US 2005/0013510 A1    Jan. 20, 2005

(30) Foreign Application Priority Data

Nov. 23, 2001   (FI) ................... 20012295

(51) Int. Cl.
*G06K 9/03*   (2006.01)
(52) U.S. Cl. ................. 382/309; 382/141; 382/154; 356/446; 356/486
(58) Field of Classification Search ............. 356/3.03, 356/3.08, 446, 486; 382/154, 228, 281, 288, 382/309
See application file for complete search history.

(56) References Cited

U.S. PATENT DOCUMENTS

| | | | |
|---|---|---|---|
| 5,543,921 A * | 8/1996 | Uzawa et al. ............... 356/401 |
| 5,870,178 A * | 2/1999 | Egawa et al. ............... 356/3.03 |
| 5,886,767 A * | 3/1999 | Snook ........................ 351/212 |
| 6,256,099 B1 * | 7/2001 | Kaufman et al. ........... 356/603 |

(Continued)

FOREIGN PATENT DOCUMENTS

EP   0 348 247   12/1989

(Continued)

OTHER PUBLICATIONS

Oksamen, Katri. "The Design and Simulation of Video Digitizing by Using Three-Dimensional CAD-Models." Helsinki University of Technology. Jul. 19, 1996. The Institute of Photogrammetry and Remote Sensing—Helsinking University of Technology. Apr. 10, 2007.*

(Continued)

*Primary Examiner*—Samir Ahmed
*Assistant Examiner*—Michael A Newman
(74) *Attorney, Agent, or Firm*—Frommer Lawrence & Haug LLP; Ronald R. Santucci

(57) ABSTRACT

The present invention concerns the discrimination of good measurement results measured by a computer vision system from bad results. By the method of the invention, values calculated from the observation vectors of several measuring devices can be discriminated into good and bad values by using a quality factor. The quality factor is calculated from the parameters of an error ellipsoid. The error ellipsoid is formed using the calculated value and the observation vectors. If the value calculated from the error ellipsoid parameters exceeds a threshold value that has been input, then the measurement result is rejected.

12 Claims, 4 Drawing Sheets

Figure 1:
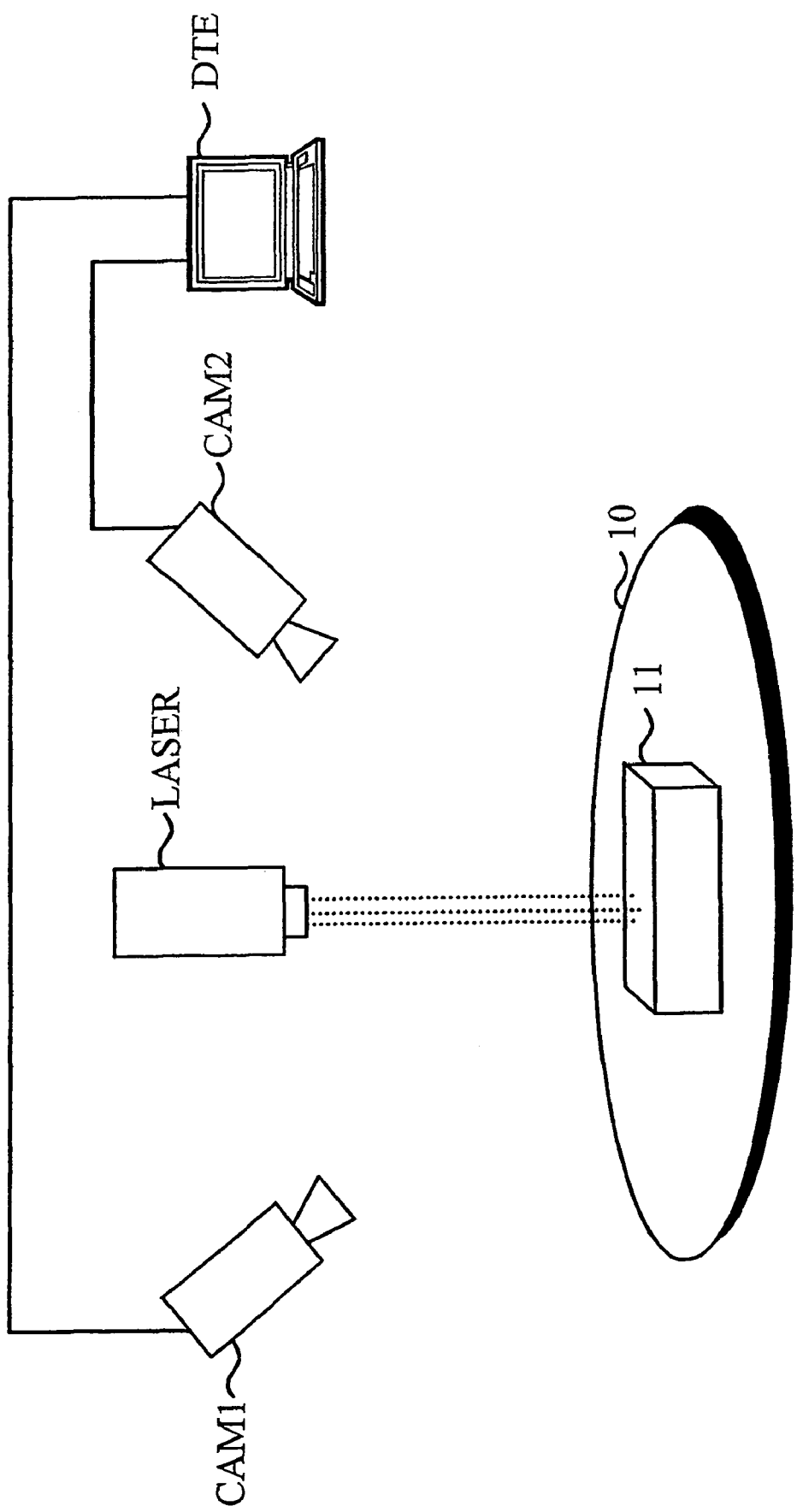

U.S. PATENT DOCUMENTS 6,337,657 B1 * 1/2002 Zhodzishsky et al. . 342/357.02
6,970,591 B1 * 11/2005 Lyons et al. ................ 382/154

FOREIGN PATENT DOCUMENTS

| GB | 2 029 570 | 3/1980 |
|----|-----------|--------|
| GB | 2 113 838 | 8/1983 |

OTHER PUBLICATIONS

Kano, Hiroshi, et al. "Stereo Vision with Arbitrary Camera Arrangement and with Camera Calibrtaion." Systems and Computers in Japan 29(1998): 47-55.*

Dalmia, Arun K., et al. "Depth extraction using a single moving camera: an integration of depth from motion and depth from stereo." Machine Vision and Applications 9(1996): 43-55.*

Rizos, Chris. "Measures of GPS Point Positioning Accuracy." Principles and Practice of GPS Surveying. Jan. 5, 2000. School of Surveying & Spatial Information Systems, UNSW. Apr. 15, 2007 <http://www.gmat.unsw.edu.au/snap/gps/gps_survey/chap2/243.htm>.*

Naruse, Hiroshi, et al. "High-Accuracy Multiviewpoint Stereo Measurement Using the Maximum-Likelihood Method." IEEE Transactions on Industrial Electronics. 44(1997): 571-578.*

* cited by examiner

QUALITY FACTOR

This application is a 371 of PCT/FI02/00949 filed on Nov. 25, 2002, published on May 30, 2003 under publication number WO 03/044459 A1 which claims priority benefits from Finnish patent application number FI 20012295 filed Nov. 23, 2001.

FIELD OF THE INVENTION

The present invention relates to three-dimensional measurement. Present invention concerns a method for discriminating bad measurement results from good results.

BACKGROUND OF THE INVENTION

Computer vision systems are based on information obtained from various measuring devices. Information can be measured using e.g. a laser device, a measuring head or via recognition from an image. The information obtained can be utilized e.g. in quality control systems, where, on the basis of this information, it is possible to determine e.g. the correctness of shape of an object, coloring errors or the number of knots in sawn timber.

The accuracy of the measurement results can be evaluated on the basis of various criteria. Measurements may involve various error components, so it is essential to discriminate bad measurement results from good ones. The accuracy of the components can be assessed by using accuracy factors. However, it is not possible to determine the inaccuracies of individual measurements by using accuracy factors; instead, these are used to describe the accuracy of a system at a general level.

In a three-dimensional computer vision system, illuminated points are typically produced on the surface of an object by using a laser. By measuring these points illuminated on the surface of the object with at least two cameras, the coordinates of the point in a three-dimensional coordinate system are obtained. However, several cameras are normally used to measure the coordinates of the point. The image coordinates measured by each camera for the same point have an effect on the three-dimensional coordinate obtained, so when several cameras are used, the accuracy of measurement of the three-dimensional coordinates is improved with a certain probability depending on the measurement parameters. On the other hand, the accuracy of three-dimensional measurement deteriorates substantially if an incorrect measurement significantly deviating from the correct value is included in the image coordinates detected by the cameras.

Methods based on a quality factor of measurement results have been used in measurements performed using theodolites. In these measurements, the consistency of a given coordinate with an observation made by another theodolite is calculated. However, these methods can not be directly applied to computer vision systems implemented using cameras because theodolite measurement involves no lens errors and the height coordinate is derived from the orientational position of the theodolite. In a camera system, all dimensions of the coordinates are measured by calculating from an image.

OBJECT OF THE INVENTION

The object of the invention is to eliminate the above-mentioned drawbacks or at least to significantly alleviate them. A specific object of the invention is to disclose a new type of method for discriminating good measurement results from bad results in a three-dimensional computer vision system based on the use of cameras.

SHORT DESCRIPTION OF THE INVENTION

Present invention concerns discrimination of measurement results in computer/machine vision systems. The present invention makes it possible to automatically discriminate bad measurement results from good results. A system utilizing the method of the invention comprises at least a camera system and a data system. In addition, the system typically comprises an illuminating device, which is used to illuminate points on the surface of the object to be measured. The illuminated points are imaged by the camera system, in which the cameras have been calibrated in the same coordinate system. The points measured by the cameras are stored in the data system for further utilization.

Although the cameras have been calibrated in the same coordinate system, the coordinates measured by them for a given point always differ slightly from each other. When the same point is measured by several cameras and the coordinates measured by them are matched, a value is obtained that is closer to the correct value than the value obtained by a minimum number of cameras. To accomplish a truly three-dimensional measurement, each point must be measured by at least two cameras.

If the coordinates measured by one of cameras are incorrect, clearly deviating from the results produced by the other cameras, then the coordinate obtained by matching the results of the set of cameras will be farther short of the correct value. By the method of the invention, it is possible to determine whether the measurement results for a given point are acceptable. Several different methods can be used for matching the points.

In the method of the invention, the points illuminated or targets otherwise visible on the surface of the object are measured by a number of cameras. After the same point has been measured by several cameras, the observation vectors measured by the cameras are matched. Next, the coordinates of the point are calculated. After the coordinates have been calculated, a so-called variance-covariance matrix is calculated from the observations made, the parameters of which matrix describe an error ellipsoid. The quality factor is obtained by calculating e.g. the mean value of the axis lengths of the ellipsoid. Another method is to use the root mean square of the ellipsoid axis lengths as projected onto the coordinate axes because it can be easily calculated from the variance-covariance matrix. This mean value can also be called a quality factor. Before starting the measurement, the greatest acceptable measuring value is input to the system, and if points having a quality factor exceeding the predetermined threshold value are detected in the measurement, they will be rejected.

In a preferred embodiment of the invention, the quality factor for each three-dimensional measurement is stored without rejecting the measurement result and the stored quality factors are used later for filtering the set of points using a desired threshold value. Thus, the measurement can be evaluated afterwards by using e.g. a new, less restrictive threshold for measurement quality.

By using the method of the invention, incorrect measurement results can be discriminated from good measurement results. Bad measurement results can be rejected or measured again. The discrimination of measurement results leads to a significant improvement in the reliability and accuracy of measurement.

LIST OF ILLUSTRATIONS

Figure 2:
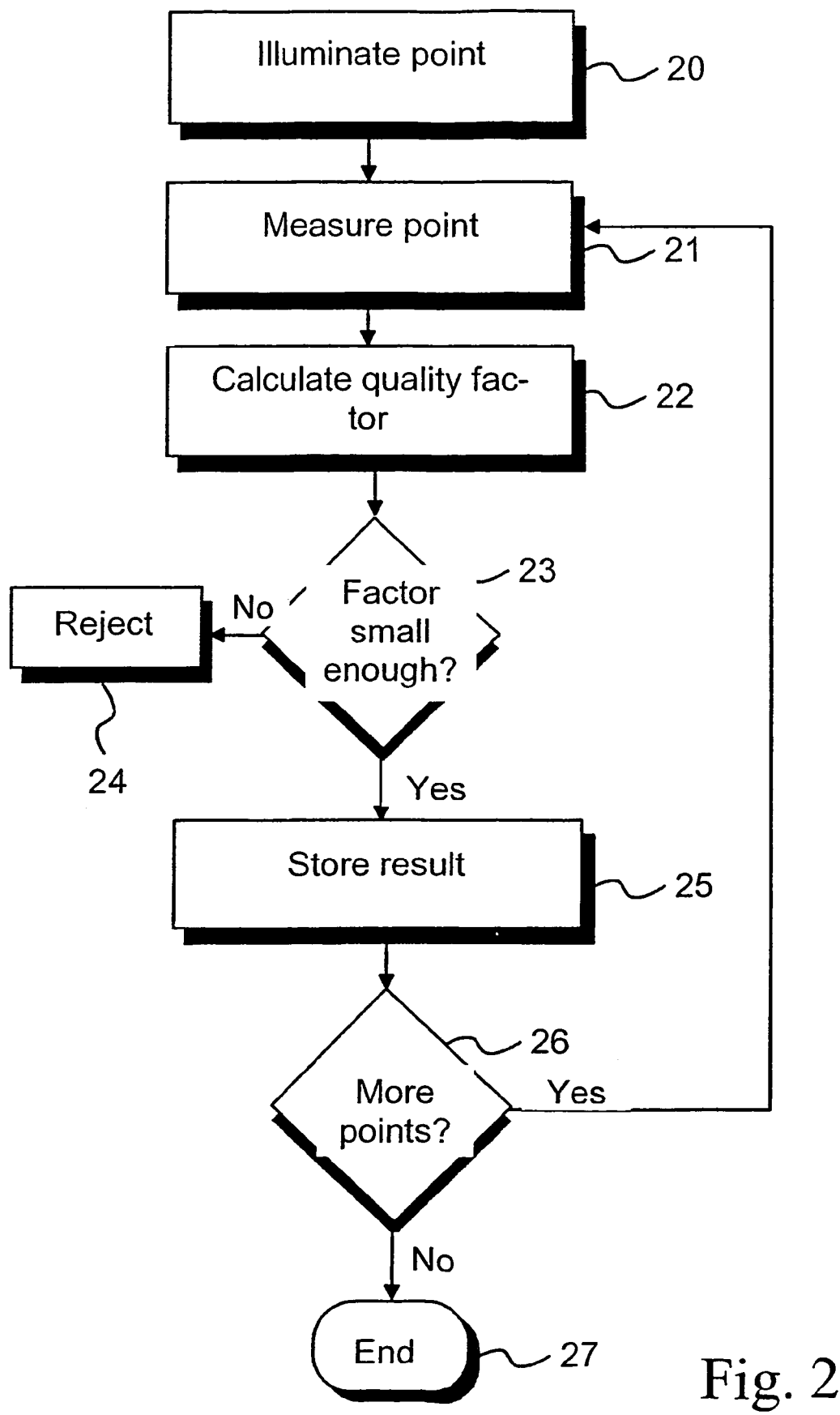
Figure 3:
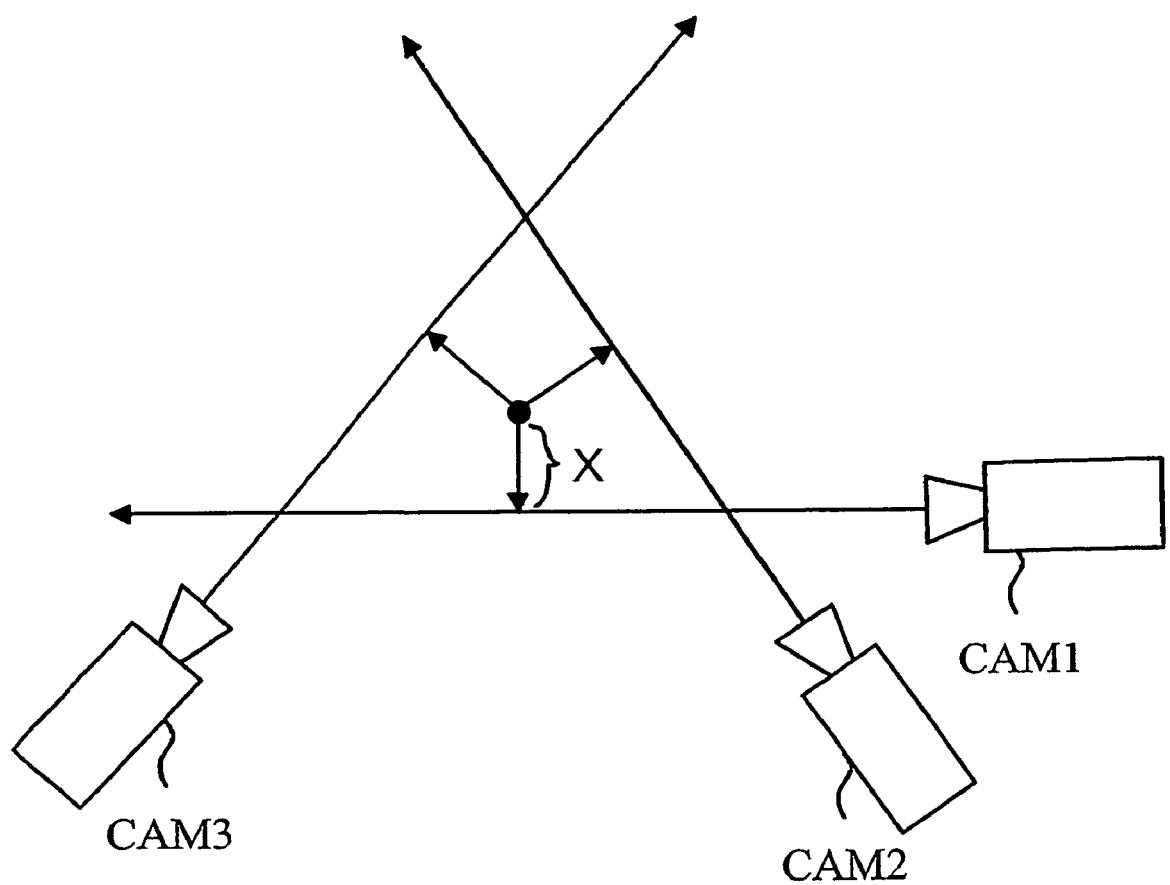
Figure 4:
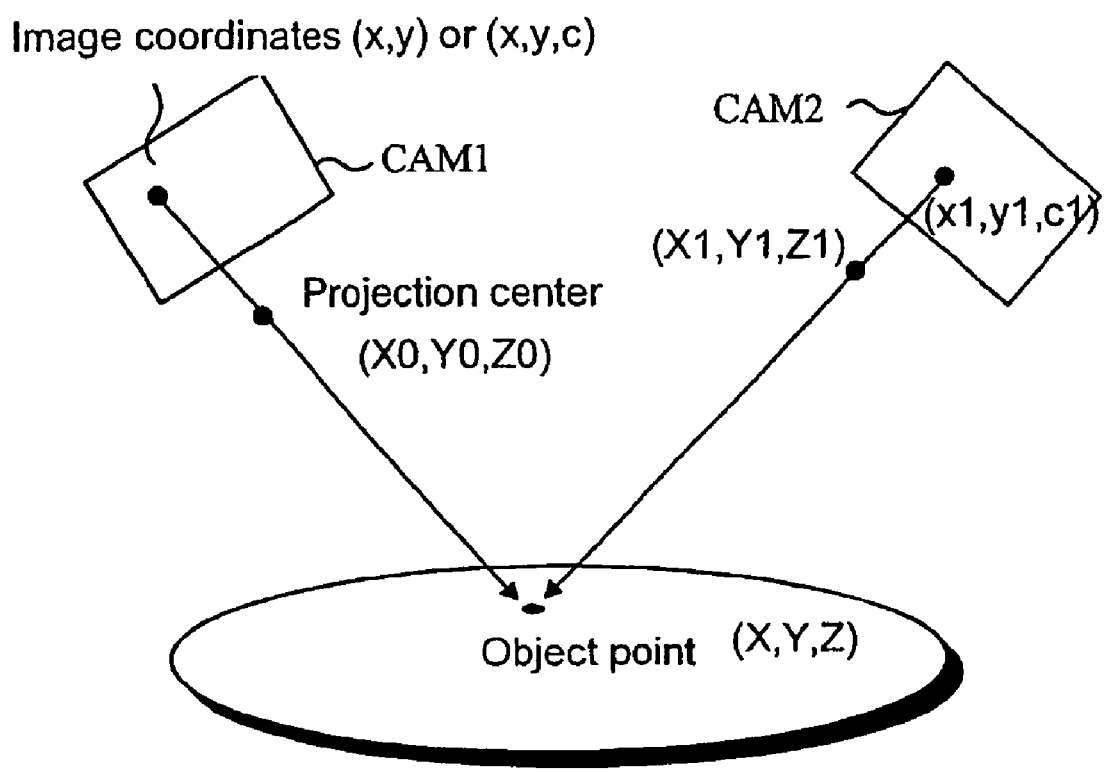

In the following, the invention will be described in detail with reference to embodiment examples, wherein FIG. 1 presents an embodiment of the system of the invention, FIG. 2 presents a function diagram of the system according to FIG. 1, FIG. 3 illustrates the matching of observation vectors, FIG. 4 illustrates the matching of observation vectors from a different view angle than FIG. 3.

DETAILED DESCRIPTION OF THE INVENTION

The system presented in FIG. 1 comprises an illuminating system LASER, a camera system consisting of two cameras CAM1 and CAM2 and a data system DTE. Moreover, the system comprises a support plate 10, on which the object 11 to be measured is placed. At the start of the measurement, a quality factor or a threshold value assigned to it is fed into the system.

When the object is being measured, it is illuminated by the illuminator LASER, by means of which typically several points are formed simultaneously. The illumination produces points on the surface of the object 11, and these are measured by the cameras CAM1 and CAM2. The illuminator LASER of the system is typically calibrated beforehand to the same coordinate system with the cameras. Using the data system DTE, the operation of the cameras CAM1 and CAM2 is controlled and the required calculations are performed to establish the coordinates. Once the coordinates have been calculated, an error ellipsoid is computed by the data system DTE. If the quality factor calculated from the parameters of the error ellipsoid is below or equal to the threshold value, then the point is accepted and stored in the memory of the data system DTE.

FIG. 2 shows a function diagram of the system presented in FIG. 1. In this embodiment, a point is first illuminated on the surface of the object to be measured, step 20. The illuminated point is measured by the cameras, whereupon the coordinates of the point are calculated mathematically from the observation vectors, step 21. The larger the number of observation vectors that can be utilized, the greater will be the accuracy of measurement of the point. After the calculation of the coordinates of the point, an error ellipsoid is computed from the observation vectors. Next, the root mean square of the axis lengths of the error ellipsoid is calculated. This root mean square is used as a quality factor, step 22.

The calculated quality factor is compared to the threshold value that was fed in at the beginning of the measurement, step 23. If the calculated value exceeds the threshold, then the point is rejected, step 24. The application may also be modified by trying to measure the point again. If the point is accepted, then its coordinates are stored in the data system, step 25. Finally, a check is performed to ascertain whether all the points illuminated by the illuminator have been measured, step 26. If unmeasured points are found, then the procedure is resumed at step 21, otherwise the measurement is ended, step 27. After the measurement has been ended, the object can be e.g. turned to a new position and measured from this position, or measurement can be started on another object. An alternative procedure is to perform all the measurements only storing the quality factor associated with each three-dimensional measurement result. This makes it possible to filter the point cloud afterwards using an arbitrary quality factor threshold.

FIG. 3 presents a measuring arrangement where the measurements are performed using three cameras CAM1, CAM2 and CAM3. Strictly speaking, the observation vectors do not meet at the same point; instead, the position of the point is calculated from the values of the observation vectors. In this example, the effects of lens errors etc. have already been eliminated from the observation vectors. The observation vectors and the calculated point are used to form an error ellipsoid, whose axis lengths can also be set to be dependent on e.g. an estimated or calculated dispersion of the image observations made or on some other known (calibrated) quantity. The ellipsoid is so positioned that the calculated point is the center of the ellipsoid. A quality factor is computed from the parameters of the ellipsoid. The quality factor can be produced e.g. from the mean value of the axis lengths or from the volume of the ellipsoid. Typically, however, the quality factor is defined as the root mean square of the axis lengths as projected onto three-dimensional coordinate axes (X,Y,Z) because this can be easily calculated from the variance-covariance matrix.

FIG. 4 illustrates a measurement corresponding to the situation in FIG. 3 from a different angle of view. In this case, the observation vectors of cameras CAM1 and CAM2 do not meet the object point exactly, being instead directed towards positions close to it. The observations measured by the cameras can be weighted, so the cameras are not necessarily all of equal significance.

In the embodiment used as an example, the quality factor used is the root mean square of the axis lengths of the ellipsoid as projected onto three-dimensional coordinate axes. If the calculated quality factor exceeds the threshold that was input at the beginning of the measurement, then the point is rejected. The root mean square can be advantageously calculated according to the following scheme:

| | |
|---|---|
| $v + l = Ax$ | Functional model |
| $\Sigma_{ll} = \sigma^2 Q_{ll}$ | Stochastic model (observation accuracy) |
| $v$ | Residual error vector |
| $l$ | Observation vector |
| $A$ | Structural matrix |
| $x$ | Parameter vector |
| $\Sigma_{ll}$ | Observation variance-covariance matrix |
| $\sigma$ | Mean observation error |
| $Q_{ll}$ | Observation weight matrix |
| $W = Q_{ll}^{-1}$ | Observation matrix |

Hence we can solve

| | |
|---|---|
| $Q_{xx} = (A^T W A)^{-1}$ | Weighting coefficients of parameters |
| $x = Q_{xx} A^T W l$ | Parameters |
| $v = Ax - l$ | Residual errors |
| $\sigma_0 = \sqrt{\dfrac{v^T W v}{n-u}}$ | Mean error of unit weight |

-continued

| | |
|---|---|
| $\sigma_i = \sigma_0 \sqrt{q_{ii}}$ | Mean error of parameter i |
| n | Number of observations |
| u | Number of parameters |
| $q_{ii}$ | $i^{th}$ diagonal element of Qxx |

The quality factor can also be calculated in other ways from the variance-covariance matrix.

The invention is not limited to the embodiment examples described above; instead, many variations are possible within the scope of the inventive concept defined in the claims.

The invention claimed is:

1. Method for discriminating good measurement results measured by a computer vision system from bad results, said method comprising the steps of:
   measuring a desired object;
   verifying the measurement result;
   accepting or rejecting the measurement;
   wherein the method further comprises the steps of:
   calculating a quality factor to represent the encounter accuracy of observation vectors drawn from two-dimensional image observations via a focal point or a similar projection point;
   comparing the quality factors to a threshold value; and
   if the quality factor calculated exceeds the threshold value, rejecting the measurement, wherein an error ellipsoid is formed by using the observation vectors and the calculated point, and wherein the quality factor is produced by calculating the mean value of the axis lengths of the error ellipsoid.

2. Method according to claim 1, wherein a threshold value for the quality factor is input at the beginning of the measurement.

3. Method according to claim 1, wherein the position of the measured point is measured by calculating from observation vectors.

4. Method according to claim 1, wherein the method further comprises a step of generating a variance-covariance matrix from the measurement results and calculating a quality factor from the elements of the variance-covariance matrix.

5. Method according to claim 1, wherein the measure point is the center of the error ellipsoid.

6. Method according to claim 1, wherein the quality factor is stored without rejecting the measurement result and the stored quality factors are used later for filtering the set of points using a desired threshold value.

7. Method for discriminating good measurement results measured by a computer vision system from bad results, said method comprising the steps of:
   measuring a desired object;
   verifying the measurement result;
   accepting or rejecting the measurement;
   wherein the method further comprises the steps of:
   calculating a quality factor to represent the encounter accuracy of observation vectors drawn from two-dimensional image observations via a focal point or a similar projection point;
   comparing the quality factors to a threshold value; and
   if the quality factor calculated exceeds the threshold value, rejecting the measurement, wherein an error ellipsoid is formed by using the observation vectors and the calculated point, and, wherein the quality factor is produced by calculating the root mean square of the axis lengths of the error ellipsoid as projected onto three-dimensional coordinate axes.

8. Method according to claim 7, wherein a threshold value for the quality factor is input at the beginning of the measurement.

9. Method according to claim 7, wherein the position of the measured point is measured by calculating from observation vectors.

10. Method according to claim 7, wherein the method further comprises a step of generating a variance-covariance matrix from the measurement results and calculating a quality factor from the elements of the variance-covariance matrix.

11. Method according to claim 7, wherein the measure point is the center of the error ellipsoid.

12. Method according to claim 7, wherein the quality factor is stored without rejecting the measurement result and the stored quality factors are used later for filtering the set of points using a desired threshold value.

\* \* \* \* \*